S. B. DRIGGS.
MODE OF RECLAIMING MARSH OR SWAMP LANDS.
No. 48,382. Patented June 27, 1865.
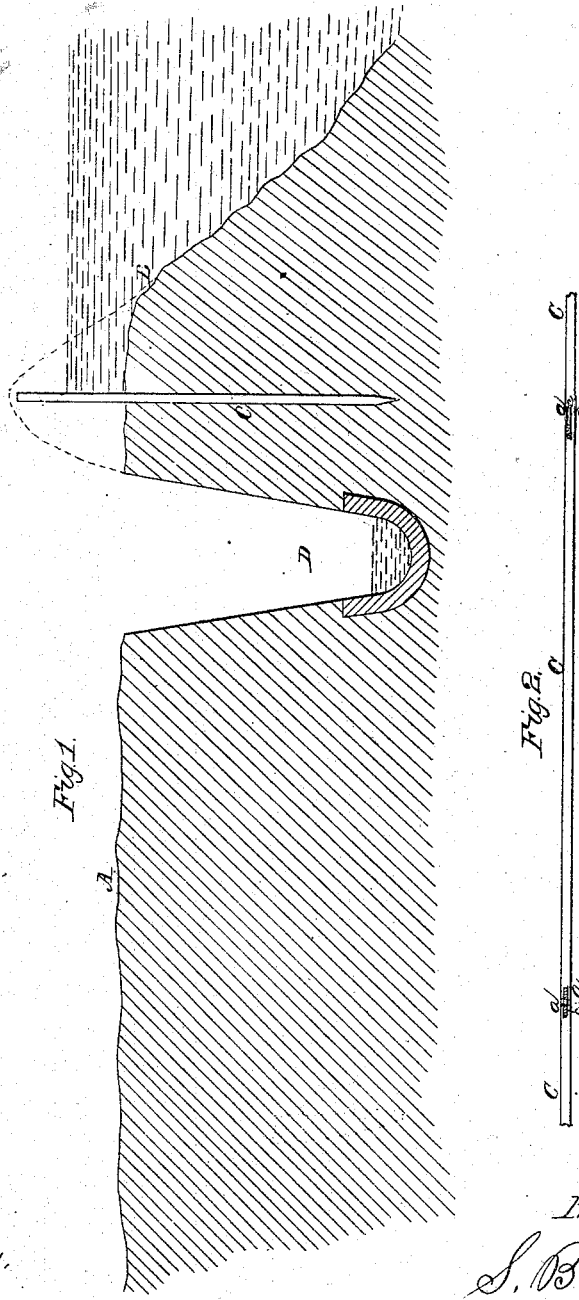

UNITED STATES PATENT OFFICE.

SPENCER B. DRIGGS, OF NEW YORK, N. Y.

IMPROVED MODE OF RECLAIMING MARSH AND SWAMP LANDS.

Specification forming part of Letters Patent No. 48,382, dated June 27, 1865.

*To all whom it may concern:*

Be it known that I, SPENCER B. DRIGGS, of the city, county, and State of New York, have invented a new and Improved Means of Reclaiming Marsh and Swamp Lands; and I do hereby declare that the following is a full, clear, and exact description of the same, reference being had to the accompanying drawings, forming part of this specification.

Marsh and swamp lands on the shores of the sea, or of bays, or lakes, and on the banks of rivers and creeks, when they have been reclaimed by shutting out the tidal or other overflow and properly drained, are almost universally the richest and most fertile lands for agricultural purposes. There are many millions of acres of such lands within short distances of our most populous cities, the only obstacles to the reclamation of which is the great cost of effecting it by means heretofore employed.

The object of this invention is to effect such reclamation in a permanent manner at comparatively small expense; and to this end it consists in the construction of a wall impervious to water by the insertion into the ground, at a suitable distance from the margin of the shore or bank, of a continuous series of iron plates with water-tight joints, such plates extending above the surface of the ground to a suitable height to shut out any ordinary tidal or other flood.

Figure 1 in the drawings is a transverse section of the bank or shore, and of the wall by which the overflow is shut out. Fig. 2 is a plan or top view of a portion of the series of iron plates.

Similar letters of reference indicate corresponding parts in both figures.

A represents the surface of the land, and B the margin of the bank or shore.

C C are the plates, of wrought or cast iron, inserted into the bank in an upright position to form the wall. These plates may be about three-eighths ($\frac{3}{8}$) or half ($\frac{1}{2}$) an inch in thickness, of any convenient length—say about twelve feet—and of any suitable height; but where the rise and fall of the water is regular, as on tidal shores, I should make them of a height about equal to the ordinary rise and fall of the tide. In all cases I should insert them into the ground to such depth that their upper edges stand above the surface A to such height as to shut out the ordinary tidal or other flow.

The several plates may be secured together in any manner that will form water-tight joints; and in order that these joints may not be of greater thickness than the other parts of the plates I prefer to make them with rabbeted edges, as shown at *a a* in Fig. 2, and to place the rabbets, together with a packing, *c*, of india-rubber or other water-proof material, between them and rivet or bolt them together.

The plates themselves may be coated with any suitable paint, or a composition that will protect them from the action of the water, or be coated with other metal by galvanic or other agency. The lower edges should be sharp, as shown in Fig. 1, to facilitate their insertion into the ground.

The ground may be prepared for the reception of the plates by cutting a groove through the turf parallel with the shore or bank, and to a suitable depth below the surface, by means of any suitable cutting device—such, for instance, as a large wheel or rotating disk having a sharp cutting-edge, such wheel being attached to a carriage driven over the ground by a steam-engine or other means, the said wheel having a greater part of the weight of the carriage (and of the engine, if one be used) bearing upon it. The plates would be placed together and secured before being inserted into the ground, and might be pressed or driven down into their place by heavy weights or any suitable means.

At the back or inside of the wall formed by the plates C C, near and parallel thereto, a ditch or trench, D, should be dug or otherwise cut to a depth lower than the bottom of the said plates, for the purpose of receiving any water that may ooze or leach through the ground under the said plates, such water to be pumped out from the lowest part of the said ditch and discharged over the margin of the bank. This ditch or trench may also receive the drainage from the surface of the land through cross-ditches of suitable depth.

The earth removed in digging the ditch D may be thrown up on the outer side to cover those portions of the plates C C which remain above the surface of the land, as shown in dotted outline in Fig. 1, thereby forming an embankment.

Instead of the plates C C being rabbeted and riveted together, they may be connected by dovetail tongues and grooves at their side edges.

What I claim as my invention, and desire to secure by Letters Patent, is—

The construction of a wall impervious to water for the reclamation of swamp or marsh lands on the shores or banks of the sea, bays, lakes, rivers, creeks, or other waters, by the insertion into the ground, at a suitable distance from the margin of the shore or bank, of a series of iron plates with water-tight joints, extending to a suitable height above the surface of the ground to shut out the ordinary tidal or other flood, substantially as herein specified.

S. B. DRIGGS.

Witnesses:
 HENRY T. BROWN,
 J. W. COOMBS.